US012218804B2

(12) United States Patent
Li et al.

(10) Patent No.: US 12,218,804 B2
(45) Date of Patent: Feb. 4, 2025

(54) METHOD OF COMMUNICATION TRAFFIC PREDICTION VIA CONTINUAL LEARNING WITH KNOWLEDGE DISTILLATION, AND AN APPARATUS FOR THE SAME

(71) Applicant: SAMSUNG ELECTRONICS CO., LTD., Suwon-si (KR)

(72) Inventors: Hang Li, Montreal (CA); Ju Wang, Brossard (CA); Chengming Hu, Montreal (CA); Xi Chen, Montreal (CA); Xue Liu, Montreal (CA); Seowoo Jang, Seoul (KR); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 264 days.

(21) Appl. No.: 17/957,499

(22) Filed: Sep. 30, 2022

(65) Prior Publication Data
US 2023/0114810 A1 Apr. 13, 2023

Related U.S. Application Data

(60) Provisional application No. 63/254,363, filed on Oct. 11, 2021.

(51) Int. Cl.
*H04L 41/16* (2022.01)
*H04L 41/0816* (2022.01)
(Continued)

(52) U.S. Cl.
CPC ........ *H04L 41/147* (2013.01); *H04L 43/0876* (2013.01)

(58) Field of Classification Search
CPC ... H04L 41/147; H04L 43/0876; H04L 41/16; H04L 41/082; H04L 41/0816; H04W 16/04; H04W 28/16
(Continued)

(56) References Cited

U.S. PATENT DOCUMENTS 11,200,497 B1   12/2021   Yan et al.
2020/0136975 A1  4/2020   Arora et al.
(Continued)

FOREIGN PATENT DOCUMENTS

CN   102056182 A   5/2011
CN   104506378 A   4/2015
(Continued)

OTHER PUBLICATIONS

Communication dated Jan. 9, 2023, issued by the International Searching Authority in counterpart International Application No. PCT/KR2022/015218 (PCT/ISA/220, 210, 237).
(Continued)

*Primary Examiner* — Jude Jean Gilles
(74) *Attorney, Agent, or Firm* — Sughrue Mion, PLLC

(57) ABSTRACT

A server for predicting a future traffic load of a base station is provided. The server may obtain a first prediction model based on traffic data collected from the base station for a first period of time, obtain a second prediction model based on traffic data collected from the same base station for a second period time, and also based on knowledge transferred from the first prediction model. Each of the first prediction model and the second prediction model may include an encoder module, a reconstruction module, and a prediction module which are connected to form two paths, an encoder-reconstruction path and an encoder-prediction path, to preserve more information of historic traffic data.

19 Claims, 10 Drawing Sheets

(51) Int. Cl.
*H04L 41/082* (2022.01)
*H04L 41/147* (2022.01)
*H04L 43/0876* (2022.01)
*H04W 16/04* (2009.01)
*H04W 28/16* (2009.01)

(58) Field of Classification Search
USPC .......................................................... 709/238
See application file for complete search history.

(56) References Cited

U.S. PATENT DOCUMENTS

| 2021/0021495 | A1 | 1/2021 | Sawabe et al. |
| 2022/0020267 | A1* | 1/2022 | Liao .................... G06Q 30/0259 |
| 2022/0104027 | A1* | 3/2022 | Gao ....................... H04W 28/16 |

FOREIGN PATENT DOCUMENTS

| CN | 111030889 A | 4/2020 |
| CN | 111369042 A | 7/2020 |
| CN | 112702329 A | 4/2021 |
| CN | 113298229 A | 8/2021 |
| CN | 113347659 A | 9/2021 |
| WO | 2020/086458 A1 | 4/2020 |
| WO | 2021/169577 A1 | 9/2021 |

OTHER PUBLICATIONS

You et al., "Learning from Multiple Teacher Networks," KDD 2017 Research Paper, pp. 1285-1294, Aug. 2017, Total 11 pages.

Boo et al., "Stochastic Precision Ensemble: Self-Knowledge Distillation for Quantized Deep Neural Networks," The Thirty-Fifth AAAI Conference on Artificial Intelligence (AAAI-21), pp. 6794-6802, May 2021, Total 10 pages.

Lin et al., "Weight Distillation: Transferring the Knowledge in Neural Network Parameters," Proceedings of the 59th Annual Meeting of the Association for Computational Linguistics and the 11$^{th}$ International Joint Conference on Natural Language Processing, pp. 2076-2088, Jul. 2021, Total 14 pages.

Extended European Search Report dated Aug. 7, 2024, issued by the European Patent Office in European Application No. 22881295.4.

Li et al., "Communication Traffic Prediction with Continual Knowledge Distillation", IEEE International Conference on Communications, 2022, DOI: 10.1109/ICC45855.2022.9838521, pp. 5481-5486 (6 pages total).

* cited by examiner

METHOD OF COMMUNICATION TRAFFIC PREDICTION VIA CONTINUAL LEARNING WITH KNOWLEDGE DISTILLATION, AND AN APPARATUS FOR THE SAME

CROSS-REFERENCE TO RELATED APPLICATION(S)

This application is based on and claims priority under 35 U.S.C. § 119 to U.S. Provisional Patent Application No. 63/254,363, filed on Oct. 11, 2021 in the U.S. Patent & Trademark Office, the disclosure of which is incorporated by reference herein in its entirety.

BACKGROUND

1. Field

The disclosure relates to a method of load forecasting via knowledge distillation, and an apparatus for the same, and more particularly to a method for forecasting a communication load of a base station via continual learning with knowledge distillation, and an apparatus for the same.

2. Description of Related Art

The Self-Organizing Network (SON) is a critical technology for fifth-generation (5G) and future communication networks to enable autonomous Operations, Administration, and Management (OAM). Prediction is critical in supporting SON functionalities, such as predictive resource allocation, dynamic spectrum management, and automated network slicing. There are twofold reasons for this. On one hand, communication networks are subject to a variety of delays, including observation delays, computing delays, and actuation delays, which can easily make a SON operation obsolete when deployed. On the other hand, future information has to be considered for stable SON operations to avoid oscillations and myopic decision making.

Traffic volume is a major reference variable for SON operations and may be one of the most fundamental metrics of communication networks. There exist numerous efforts on traffic prediction, tracing back to the Global System for Mobile Communications (GSM) systems and even earlier systems. Traditional methods use statistics or probabilistic distributions for traffic prediction. Recently, machine learning (ML) based methods, especially neural networks (NNs) show their strong power in modeling a non-linear relationship or characteristic in data, and thus can further improve the prediction accuracy.

Although existing ML-based approaches achieve great success in traffic prediction, there are drawbacks that prevent their real-world applications. On one hand, the traffic patterns and volumes keep changing in the real world. As a result, the prediction models trained on previous data are unable to generalize effectively to a new situation and may suffer large prediction errors. On the other hand, traditional ML or NN models rely on a large amount of data for training an accurate model. However, the capacity of a base station is limited, and historical data of the base station are discarded when new data arrives. Thus, a base station can only store a small amount of traffic data, which may cause accuracy degradation of a prediction model. One of the seemingly possible solutions is collecting data from other base stations and training prediction models on these newly collected large data sets. However, it could be quite expensive and difficult due to the hidden Operating Expenses (OPEX) and overheads including the bandwidth cost for migrating data into long-term storage, and the degradation of computing resource utilization due to frequent disk writes.

SUMMARY

Example embodiments address at least the above problems and/or disadvantages and other disadvantages not described above. Also, the example embodiments are not required to overcome the disadvantages described above and may not overcome any of the problems described above.

According to an aspect of the disclosure, a server for predicting future load in a communication system, may include: at least one memory storing computer-readable instructions; and at least one processor configured to execute the computer-readable instructions to: obtain a first traffic data set from a base station during a first period of time; obtain a first artificial intelligence (AI) model configured to extract first features from the first traffic data set, reconstruct the first traffic data set based on the extracted first features, and predict a first traffic load based on the extracted first features; obtain a second traffic data set from the base station, during a second period time that follows the first period of time; obtain a second AI model that structurally correspond to the first AI model but has different model parameters from the first AI model, and is configured to extract second features from the second traffic data set, reconstruct the second traffic data set based on the extracted second features, and predict a second traffic load based on the extracted second features; and update the second AI model by converging an aggregated loss that includes a reconstruction loss between the second traffic data set and the reconstructed second traffic data set, a prediction loss between the predicted second traffic load and a ground-truth traffic load, a reconstruction distillation loss between the reconstructed first traffic data set and the reconstructed second traffic data set, and a prediction distillation loss between the predicted first traffic load and the predicted second traffic load.

The first AI model may include a first encoder network configured to extract the first features from the first traffic data set, a first reconstruction network configured to reconstruct the first traffic data set based on the extracted first features, and a first prediction network configured to predict the first traffic load based on the extracted first features. The second AI model may include a second encoder network configured to extract the second features from the second traffic data set, a second reconstruction network configured to reconstruct the second traffic data set based on the extracted second features, and a second prediction network configured to predict the second traffic load based on the extracted second features. The first encoder network, the first reconstruction network, and the first prediction network structurally correspond to the second encoder network, the second reconstruction network, and the second prediction network, respectively, but have the different model parameters from the second encoder network, the second reconstruction network, and the second prediction network, respectively.

Each of the first encoder network and the second encode network is a feed-forward neural network including hidden layers.

Each of the first reconstruction network and the second reconstruction network may include at least one linear layer and at least one ReLU activation function layer.

Each of the first reconstruction network and the second reconstruction network may include at least one linear layer and at least one ReLU activation function layer.

The at least one processor is further configured to: delete the first traffic data set after the first period of time elapses; and update the second AI model based on the first AI model without using the first traffic data set that is collected from the base station during the first period of time.

The at least one processor is further configured to: store the updated second AI model to predict the second traffic load of the base station, in response to determining that the aggregated loss of the updated second AI model converges.

The at least one processor is further configured to: compute a mean absolute error of the updated second AI model as the aggregated loss of the updated second AI model.

The at least one processor is further configured to: apply a time-based sliding window to traffic data to obtain an n number of traffic data samples for a sequence of time slots including the first period of time and the second period of time; and among the n number of traffic data samples, use a first n−1 number of traffic data samples as an input vector, and use a last traffic data sample as the ground-truth traffic load, wherein the input vector corresponds to the first traffic data set that is input the first AI model, or the second traffic data set that is input the second AI model.

According to another aspect of the disclosure, a method of predicting future load in a communication system, may include: obtaining a first traffic data set from a base station during a first period of time; obtaining a first artificial intelligence (AI) model configured to extract first features from the first traffic data set, reconstruct the first traffic data set based on the extracted first features, and predict a first traffic load based on the extracted first features; obtaining a second traffic data set from the base station, during a second period time that follows the first period of time; obtaining a second AI model that structurally correspond to the first AI model but has different model parameters from the first AI model, and is configured to extract second features from the second traffic data set, reconstruct the second traffic data set based on the extracted second features, and predict a second traffic load based on the extracted second features; and updating the second AI model by converging an aggregated loss that includes a reconstruction loss between the second traffic data set and the reconstructed second traffic data set, a prediction loss between the predicted second traffic load and a ground-truth traffic load, a reconstruction distillation loss between the reconstructed first traffic data set and the reconstructed second traffic data set, and a prediction distillation loss between the predicted first traffic load and the predicted second traffic load.

The method may further include: extracting the first features from the first traffic data set via a first encoder network of the first AI model; reconstructing the first traffic data set based on the extracted first features via a first reconstruction network of the first AI model; predicting the first traffic load based on the extracted first features via a first prediction network of the first AI model; extracting the second features from the second traffic data set via a second encoder network of the second AI model; reconstructing the second traffic data set based on the extracted second features via a second reconstruction network of the second AI model; and predicting the second traffic load based on the extracted second features via a second prediction network of the second AI model. The first encoder network, the first reconstruction network, and the first prediction network structurally correspond to the second encoder network, the second reconstruction network, and the second prediction network, respectively, but have the different model parameters from the second encoder network, the second reconstruction network, and the second prediction network, respectively.

The method may further include: deleting the first traffic data set after the first period of time elapses; and updating the second AI model based on the first AI model without using the first traffic data set that is collected from the base station during the first period of time.

The method may further include: storing the updated second AI model to predict the second traffic load of the base station, in response to determining that the aggregated loss of the updated second AI model converges.

The method may further include: computing a mean absolute error of the updated second AI model as the aggregated loss of the updated second AI model.

The method may further include: applying a time-based sliding window to traffic data to obtain an n number of traffic data samples for a sequence of time slots including the first period of time and the second period of time; and among the n number of traffic data samples, using a first n−1 number of traffic data samples as an input vector, and using a last traffic data sample as the ground-truth traffic load, wherein the input vector may correspond to the first traffic data set that is input the first AI model, or the second traffic data set that is input the second AI model.

According to another aspect of the disclosure, a non-transitory computer readable storage medium which is configured to, when executed by at least one processor, to perform a method of predicting future load in a communication system, is provided. The method may include: obtaining a first traffic data set from a base station during a first period of time; obtaining a first artificial intelligence (AI) model configured to extract first features from the first traffic data set, reconstruct the first traffic data set based on the extracted first features, and predict a first traffic load based on the extracted first features; obtaining a second traffic data set from the base station, during a second period time that follows the first period of time; obtaining a second AI model that structurally correspond to the first AI model but has different model parameters from the first AI model, and is configured to extract second features from the second traffic data set, reconstruct the second traffic data set based on the extracted second features, and predict a second traffic load based on the extracted second features; and updating the second AI model by converging an aggregated loss that includes a reconstruction loss between the second traffic data set and the reconstructed second traffic data set, a prediction loss between the predicted second traffic load and a ground-truth traffic load, a reconstruction distillation loss between the reconstructed first traffic data set and the reconstructed second traffic data set, and a prediction distillation loss between the predicted first traffic load and the predicted second traffic load.

The method may further include: extracting the first features from the first traffic data set via a first encoder network of the first AI model; reconstructing the first traffic data set based on the extracted first features via a first reconstruction network of the first AI model; predicting the first traffic load based on the extracted first features via a first prediction network of the first AI model; extracting the second features from the second traffic data set via a second encoder network of the second AI model; reconstructing the second traffic data set based on the extracted second features via a second reconstruction network of the second AI model; and predicting the second traffic load based on the extracted second features via a second prediction network of the second AI model. The first encoder network, the first reconstruction network, and the first prediction network may structurally correspond to the second encoder network, the second reconstruction network, and the second prediction network, respectively, but have the different model parameters from the second encoder network, the second reconstruction network, and the second prediction network, respectively.

The method may further include: deleting the first traffic data set after the first period of time elapses; and updating the second AI model based on the first AI model without using the first traffic data set that is collected from the base station during the first period of time.

The method may further include: storing the updated second AI model to predict the second traffic load of the base station, in response to determining that the aggregated loss of the updated second AI model converges.

The method may further include: applying a time-based sliding window to traffic data to obtain an n number of traffic data samples for a sequence of time slots including the first period of time and the second period of time; and among the n number of traffic data samples, using a first n−1 number of traffic data samples as an input vector, and using a last traffic data sample as the ground-truth traffic load. The input vector may correspond to the first traffic data set that is input the first AI model, or the second traffic data set that is input the second AI model.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
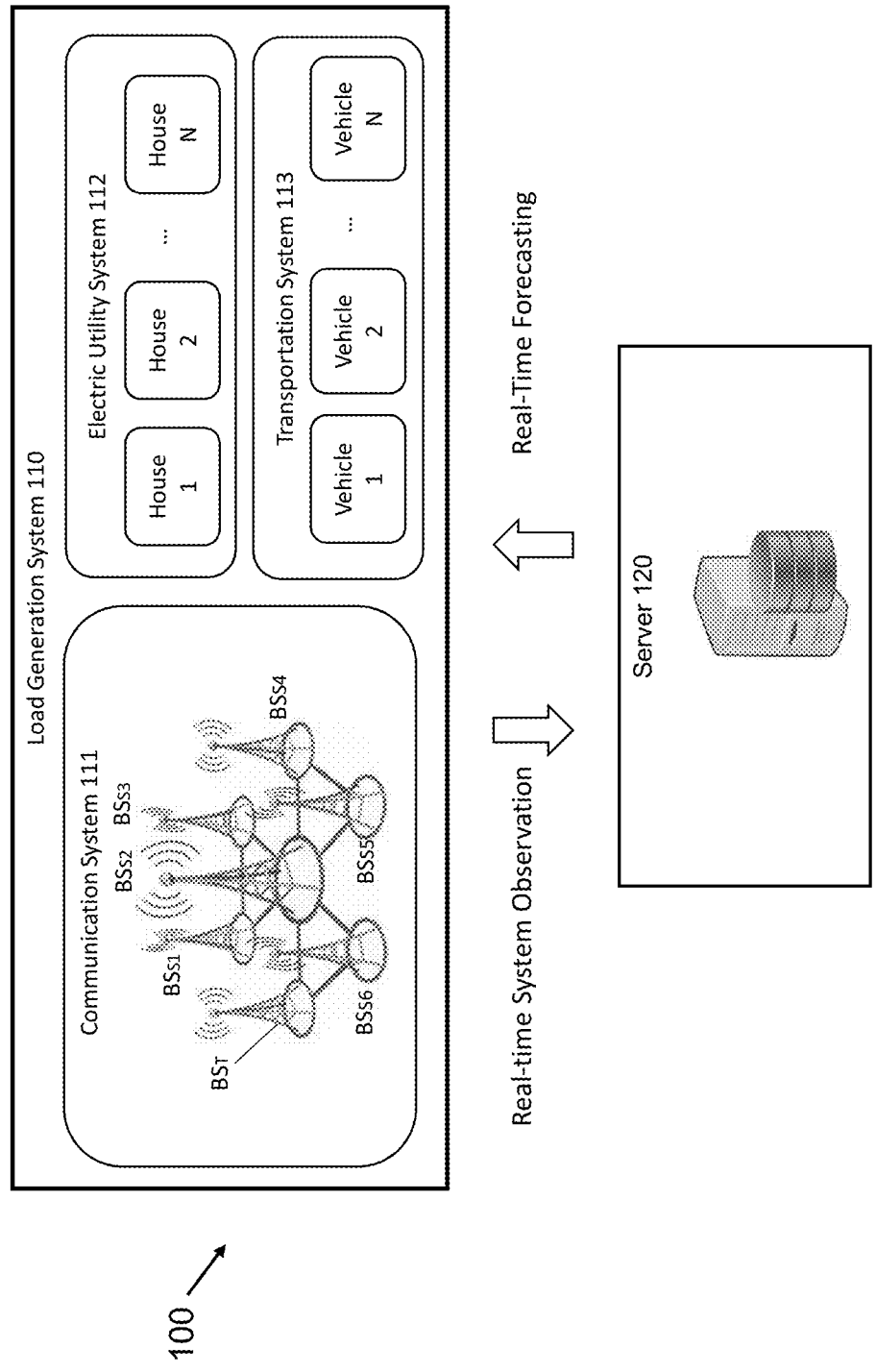
FIG. 1 is a diagram showing a general overview of a system for predicting future loads according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

One or more embodiments of the present disclosure provide a neural network model that is trained via continual knowledge distillation, which is adapted to constantly changing communication traffic scenarios without the need of a large amount of data.

FIG. 1 is a diagram showing a general overview of a system 100 for predicting future loads according to embodiments. The system 100 may be used to forecast any type of load having corresponding information that can be used to predict a future load, and is not limited to the specific example embodiments discussed herein. For example, the system 100 can be used to predict electric loads, communication system traffic loads, transportation traffic loads, and the like.

The system 100 may include a load generation system 110 and a server 120. The load generation system 110 may refer to a communication system 111, an electric utility system 112, or a transportation systems 113, but the embodiments of the present disclosure are not limited thereto.

The communication system 111 may include a plurality of base stations BST and $BS_{S1}$-$BS_{S6}$, which communicate with the server 120. Among the plurality of base stations BST and $BS_{S1}$-$BS_{S6}$, the base station BST may be referred to as a target base station BST, and the base stations $BS_{S1}$-$BS_{S6}$ may be referred to as source base stations $BS_{S1}$-$BS_{S6}$ which provide source data for predicting a future communication load of the target base station BST. The plurality of base stations BST and $BS_{S1}$-$BS_{S6}$ may transmit real-time system observation results to the server 120, and the server 120 may predict a future load of the target base station BST based on the real-time system observation results.

The server 120 may receive the real-time system observation data from the communication system 111. The real-time system observation data may include information of a communication system state, such as a number of active user equipment (UEs) in each cell, a cell load ratio, an internet protocol (IP) throughout per cell, and a cell physical resource block (PRB) usage ratio.

The server 120 may be implemented as a single server configured to receive traffic data from the plurality of base stations BST and $BS_{S1}$-$BS_{S6}$, and predict a future communication load of each of the plurality of base stations BST and $BS_{S1}$-$BS_{S6}$. Alternatively, the server 120 may be implemented as a plurality of servers, wherein each of the plurality of servers predicts a future communication load of a corresponding one of the plurality of base stations BST and $BS_{S1}$-$BS_{S6}$.

The electric utility system 112 may include house 1 through house N that consume electricity, and the server 120 may obtain historical time sequence data from each of the houses 1-N. The server 120 may predict a future electric load of a target house via a new model of the target house by transferring knowledge from an old model to the new model. In particular, the old model is trained based on historical time sequence data of the target house, and the new model is trained based on newly collected time sequence data of the target house and the knowledge transferred from the old model. For example, the time sequence data may include electric load consumption data, temperature data, weather data, and the day of the week (e.g., weekday or weekend) corresponding to the target house. The time sequence data are not limited to the above examples, and may include other type of data that may be indicative of future electric load.

The transportation systems 113 may include vehicle 1 through vehicle N that causes roadway traffic. The server 120 may predict a future transportation traffic load caused by a target vehicle via a new model of the target vehicle by transferring knowledge from an old model to the new model. In particular, the old model is trained based on historical traffic patterns of the target vehicle, and the new model is trained based on newly collected traffic patterns of the target vehicle and the knowledge transferred from the old model.

For the sake of explanation, the following description will discuss an embodiment that predicts a communication traffic load of a target base station.

In embodiments of the present disclosure, a first prediction model first learns knowledge of historical traffic data of a target base station as much as possible by using a two-branch neural network structure. The two-branch neural network structure includes an encoder-reconstruction structure configured to preserve a compact knowledge, and an encoder-prediction structure configured to achieve accurate prediction. Then, the knowledge from the first prediction model (e.g., an old prediction model) is transferred to a second prediction model (e.g., a new prediction model) via a continual knowledge distillation technique. The second prediction model may have the same or substantially the same structure as the first prediction model, but may have different model parameters from the first prediction model.

Although each base station has a limited amount of data available for a given time period, there is a large amount of historical data that may help improve the prediction accuracy. Additionally, saving models may be more efficient than saving data, since models occupy less storage space than historic traffic data collected from each base station. Thus, instead of maintaining all historical traffic data, a server according to embodiments of the present disclosure may only save old prediction models (which were trained using historical traffic data) for cost efficiency.

Figure 2:
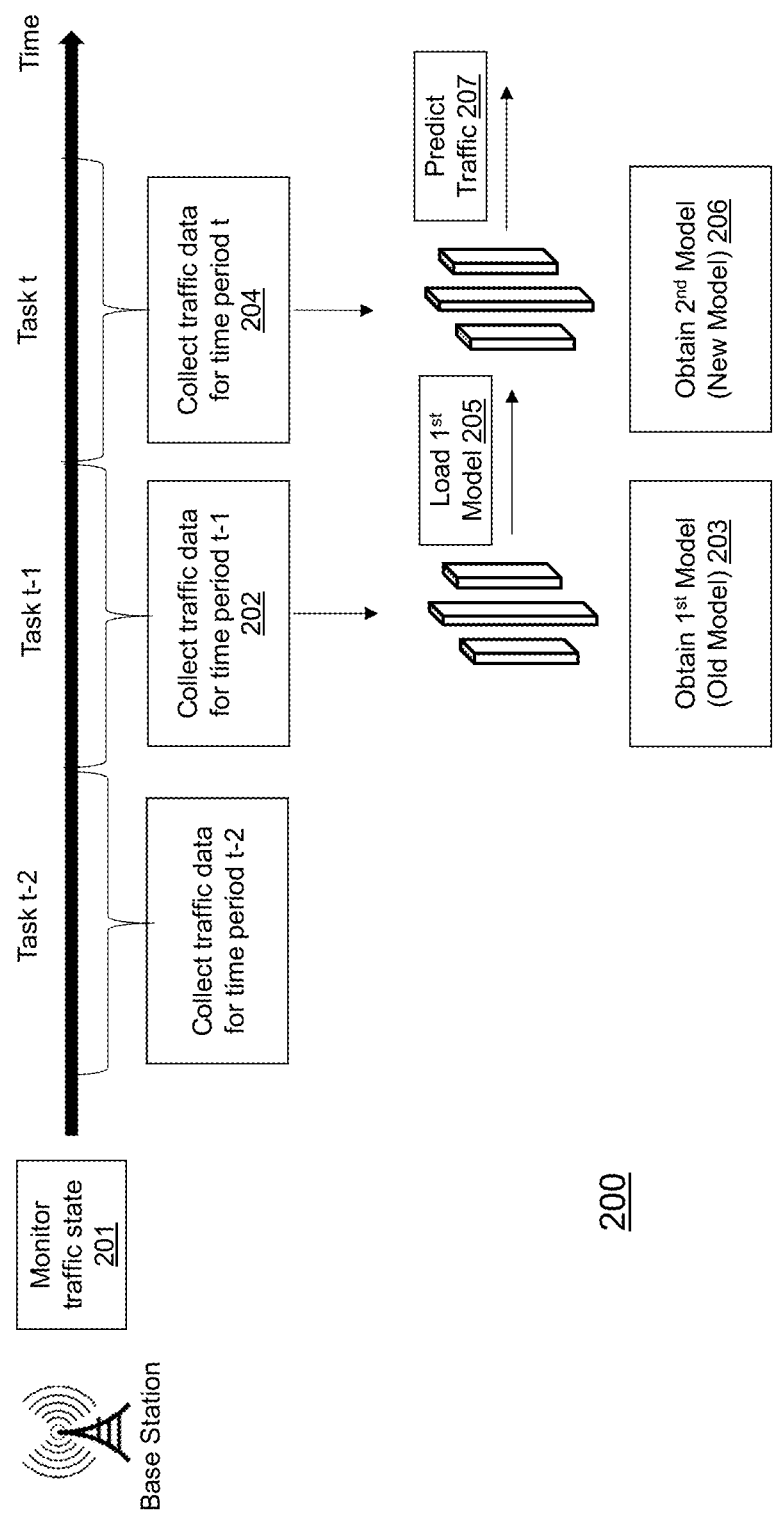
FIG. 2 illustrates a method 200 of predicting a traffic load of a target base station according to embodiments of the present disclosure.

FIG. 2 illustrates a method 200 of predicting a traffic load of a target base station according to embodiments.

The method 200 may include operation 201 of monitoring a traffic state of a base station, operation 202 of collecting traffic data for a time period t−1, operation 203 of obtaining a first prediction model (i.e., an old prediction model) based on the traffic data obtained for the time period t−1, operation 204 of collecting traffic data for a time period t, operation 205 of loading the first prediction model, operation 206 of obtaining a second prediction model (i.e., a new prediction model) based on the traffic data obtained for the time period t, and also based on knowledge transferred from the first prediction model, and operation 207 of predicting a future traffic load of the base station via the second prediction model. Each of the first prediction model and the second prediction model may be an artificial-intelligence (AI) technology based model (also referred to as an AI model), and may include one or more neural networks.

In operations 201, 202, and 204, the base station monitors traffic conditions and records traffic data every time slot (e.g., 1 hour). Due to the capacity limitation on each base station, the base station may only store the traffic data for a certain period of time (i. e., past n time slots). When the base station collects new traffic data during the time period tin operation 204, the base station may overwrite the historical traffic data collected during the time period t−1 with the new traffic data collected during the time period t.

In operation 203, the first prediction model is trained based on the traffic data collected during the time period t−1. The first prediction model may include an encoder network, a reconstruction network, and a prediction network, which are connected to form a two-branch structure. An output layer of the encoder network is connected to an input layer of the reconstruction network to form an encoder-reconstruction structure, and the reconstruction network is trained to minimize or converge a reconstruction loss. The output layer of the encoder network is also connected to an input layer of the prediction network to form an encoder-prediction structure, and the encoder network is trained to minimize or converge a prediction loss. The structure of the first prediction model will be further described later with reference to FIG. 3.

Operations 205 and 206 are performed to update the first prediction model to the second prediction model. The second prediction model may have the same or substantially the same structure as the first prediction model while having different model parameters from the first prediction model.

When a model update is performed to predict a future traffic load of the base station, a server included in the base station or provided separately from the base station may delete the historical traffic data of the target base station while keeping the first prediction model. The server then may build the second prediction model for example, by copying the first prediction model, initializing model parameters (e.g., weights and biases) of the first prediction model, and saving the first prediction model with the initialized model parameters model parameters as the second prediction model. Alternatively, the server may store structural information of a traffic prediction model, and may load the structural information to build each of the first prediction model and the second prediction model so that each prediction model has the same network structure. When the number of layers and connections between the layers are the same between two models, it is determined that the two models have the same network structure.

In operation 206, the second prediction model is trained based on the traffic data collected during the time period t, and also based on knowledge transferred from the first prediction model. The second prediction model is updated by minimizing a difference between a prediction value of the second prediction model and a ground truth value, and a difference between a prediction value of the first prediction mode and the prediction value of the second prediction model.

Once the second prediction model is obtained, the future traffic load is predicted based on the second prediction model in operation 207.

Figure 3:
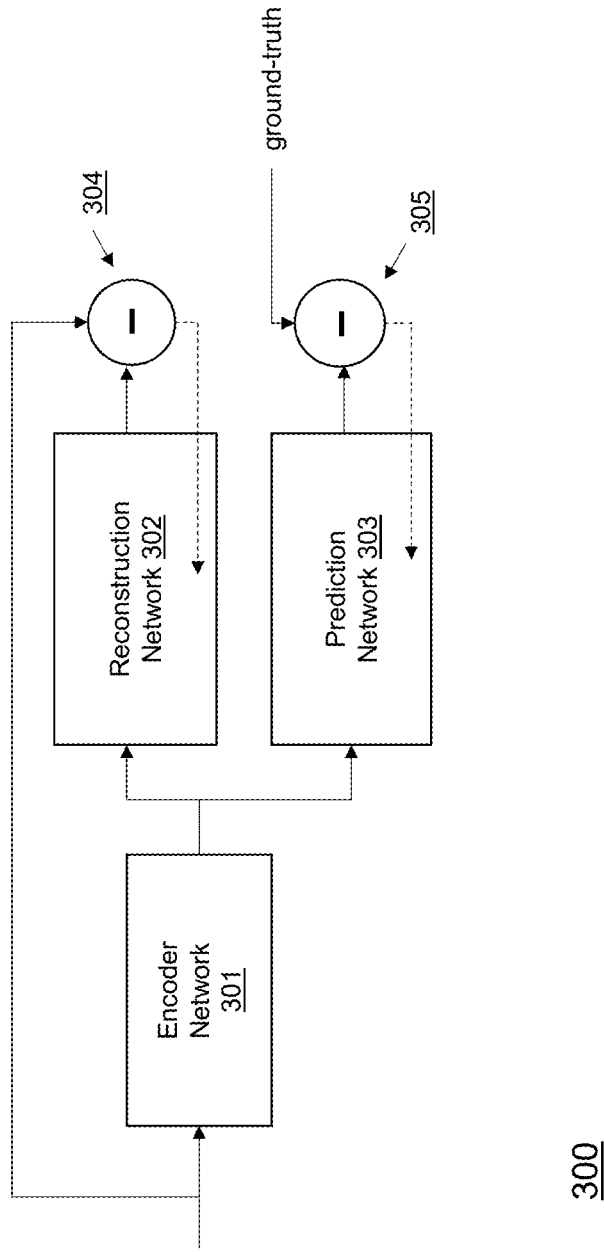
FIG. 3 illustrates a structure of a prediction model according to embodiments of the present disclosure.

FIG. 3 illustrates a structure of a prediction model according to embodiments of the present disclosure.

As shown in FIG. 3, a prediction model 300 may include an encoder network 301, a reconstruction network 302, a prediction network 303, a first loss calculator 304, and a second loss calculator 305. The encoder network 301 may be a feed-forward neural network having hidden layers (e.g., four hidden layers which have 32, 128, 512, and 128 dimensions separately) and a ReLU activation function following each hidden layer. The reconstruction network 302 may has a plurality of linear layers (e.g., two linear layers with 32 and 128 neurons respectively), and each linear layer is followed by an ReLU activation function. The prediction network 303 may include one or more linear layers (e.g., one linear layer with 32 neurons).

The prediction model has two paths, an encoder-reconstruction path and an encoder-prediction path.

The encoder-reconstruction path contains the encoder network 301 with first parameters $\theta_1$ followed by the reconstruction network 302 with second parameters $\theta_2$. The encoder network 301 is configured to extract features from a data point, and the reconstruction network 302 is configured to reproduce the (original) data point based on the extracted features. The first loss calculator 304 is configured to calculate a reconstruction loss which represents a difference between the original data point that is input to the encoder network 301, and the reproduced data point that is output from the reconstruction network 302. The reconstruction loss is back-propagated to the reconstruction network 302 and the encoder network 301 to update the first parameters $\theta_1$ and the second parameters $\theta_2$ to minimize or converge the reconstruction loss, for example, via a gradient descent method. A loss is determined to be minimized or converges when the loss has reached its minimum point or a predetermined minimum value (e.g., a value from 0 to 0.1), or when the loss does not reduce any longer and therefore has reached a constant value. For example, when the loss does not decrease within a preset consecutive iterations (e.g., 3 consecutive iterations), it is determined that the loss has converged and the training process is completed.

The first parameters $\theta_1$ of the encoder network 301 are updated via the encoder-reconstruction path such that the encoder network 301 extracts features which are most suitable for the prediction network 303 to obtain an accurate prediction result. When the features extracted by the encoder network 301 allow the reconstruction network 302 to reproduce the original data as similar as possible, it may be determined that the encoder network 301 is optimized to provide suitable features to the prediction network 303 for an accurate prediction. The reconstruction loss is calculated to determine how similar the original data is reproduced through the encoder-reconstruction path.

According to an embodiment, the reconstruction loss may be computed as follows:

$$L_{rec} = \frac{1}{m}\sum_{i}^{m} d(f_{rec}(x_i; \theta_1, \theta_2), x_i) \qquad \text{Equation (1)}$$

Where $x_i$ denotes the original data point that is input to the encoder network, $f_{rec}(x_i; \theta_1, \theta_2)$ denotes the reproduced data point that is output from the reconstruction network, $d(\cdot, \cdot)$ is a distance metric between two vectors, and m denotes a number of data points that are input to the encoder network. L2-norm may be used for the distance metric in an embodiment.

The encoder-prediction path contains the encoder network 301 having the first parameters $\theta_1$, which is followed by the prediction network 303 having third parameters $\theta_3$.

The encoder-prediction path shares the same encoder network with the encoder-reconstruction path and then diverges into the separate prediction network 303 having the third parameters $\theta_3$. The encoder-prediction path takes the same data point as the encoder-reconstruction path, and outputs a predicted future traffic load. The second loss calculator 305 may calculate a prediction loss which represents a difference between the predicted future traffic load and a ground-truth traffic load. For example, the prediction loss may be computed as follows:

$$L_{pred} = \frac{1}{m}\sum_{i}^{m} d(f_{pred}(x_i; \theta_1, \theta_3), y_i) \qquad \text{Equation (2)}$$

Where $y_i$ denotes the ground-truth traffic load, and $f_{pred}(x_i; \theta_1, \theta_2)$ denotes the predicted future traffic load that is output from the prediction network 303.

By having the encoder network 301 shared between the encoder-reconstruction path and the encoder-prediction path, the network parameters (e.g., weights and biases) of the encoder network 301 are updated and optimized to extract features which are representative for both prediction and reconstruction operations. In this way, the traffic prediction model according to embodiments can preserve more information of traffic data than a model that is trained solely for prediction purposes. Although the base station may not be able to store all historical traffic data, the traffic prediction model according to embodiment can leverage knowledge preserved in an old prediction model, which is trained using historical traffic data.

The structure of the traffic prediction model illustrated in FIG. 3 may be applied to the first prediction model and the second prediction model illustrated in FIG. 2.

Figure 4:
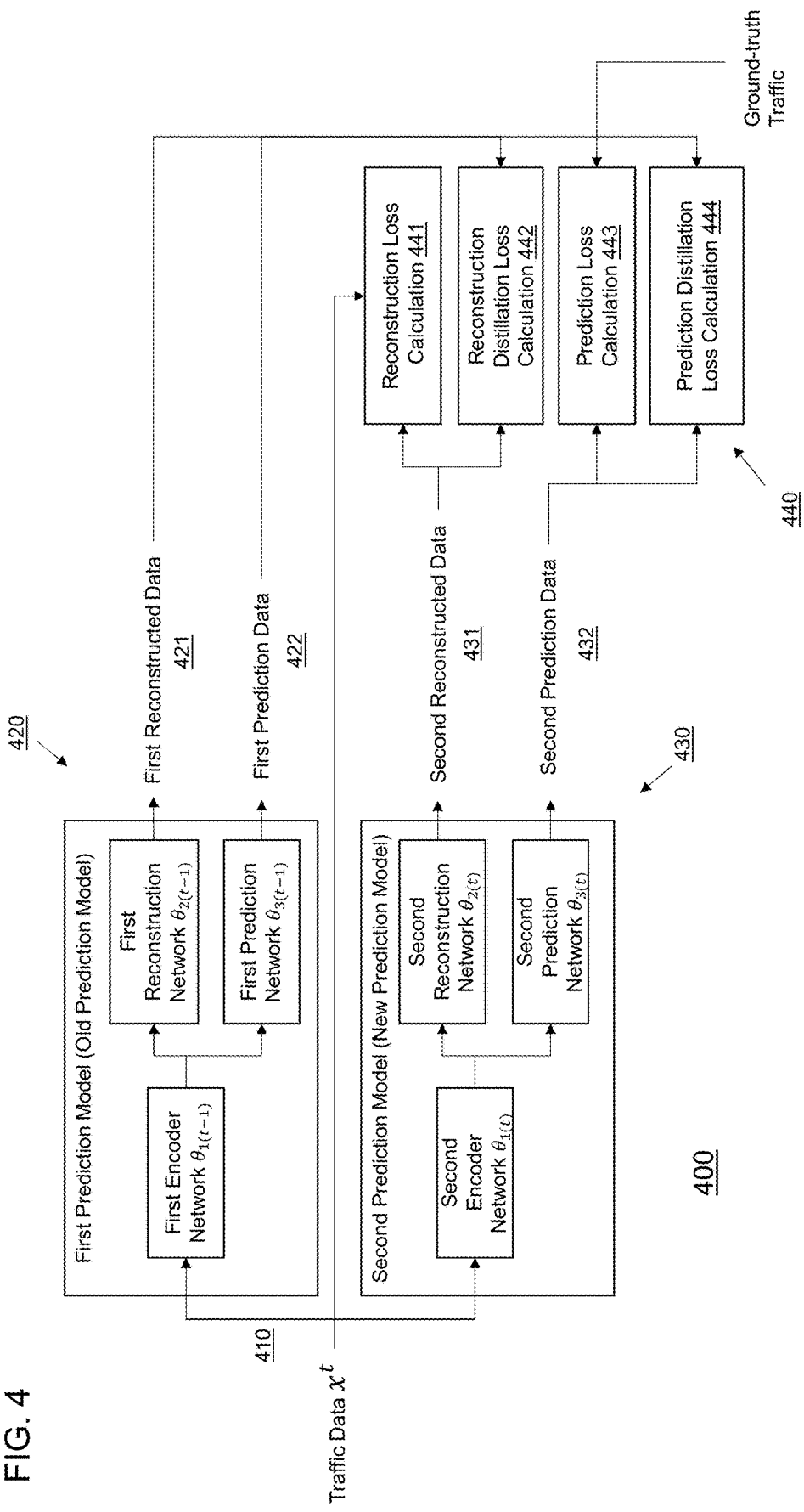
FIG. 4 illustrates a method of updating an old prediction model to a new prediction model via knowledge distillation according to embodiments of the present disclosure.

FIG. 4 illustrates a method of updating an old prediction model to a new prediction model via knowledge distillation according to embodiments of the present disclosure.

Referring to FIG. 4, a method 400 for updating a first prediction model to a second prediction model may include operation 410 of inputting current traffic data that is collected at a current task time t, to the first prediction model and the second prediction model. The first prediction model is trained using historical traffic data that is collected in the past, at a past task time t−1. For example, the first prediction model is trained to minimize or converge a reconstruction loss and a prediction loss using Equations (1) and (2) discussed above, and the second prediction model is trained by transferring knowledge from the trained first prediction model. The network parameters of the first prediction model may be fixed when the second prediction model is trained and updated.

In operation 420, the first prediction model may extract features from the current traffic data via a first encoder network, and may input the extracted features to a first reconstruction network and a first prediction network, respectively, to obtain as output a first reconstructed data and a first prediction data from the first reconstruction network and the first prediction network, respectively.

Specifically, operation 420 may include operation 421 of obtaining the first reconstructed data via a first encoder-reconstruction path, and operation 422 of obtaining the first prediction data via a first encoder-prediction path. The first prediction model may contain knowledge from the historical traffic data, which is to be transferred to the second prediction model through loss functions that use the first reconstructed data and the first prediction data as reference values. The first reconstructed data may include highly-representative knowledge of the historic traffic data. The first prediction data may include traffic pattern information obtained from the historic traffic data.

In operation 430, the second prediction model may extract features from the current traffic data via a second encoder network, and may input the extracted features to a second reconstruction network and a second prediction network, respectively, to obtain as output a second reconstructed data and a second prediction data from the second reconstruction network and the second prediction network, respectively. Operation 430 may include operation 431 of obtaining the second reconstructed data via a second encoder-reconstruction path, and operation 432 of obtaining the second prediction data via a second encoder-prediction path.

The second encoder network, the second reconstruction network, and the second prediction network may have the same or substantially the same network structure as the first encoder network, the first reconstruction network, and the first prediction network, respectively, while having different network parameters from the first encoder network, the first reconstruction network, and the first prediction network, respectively.

In operation 440, an aggregated loss of the second prediction model may be computed. The aggregated loss of the second prediction model may include a reconstruction loss, a prediction loss, a reconstruction distillation loss, and a prediction distillation loss.

In detail, operation 440 may include operation 441 of computing the reconstruction loss which represents a difference between the original traffic data that is input to the second prediction model, and the second reconstructed data, operation 442 of computing the reconstruction distillation loss which represents a difference between the first reconstructed data and the second reconstructed data, operation 443 of computing the prediction loss which represents a difference between the second prediction data that is output from the second prediction model, and a ground-truth prediction, and operation 444 of computing the prediction distillation loss which represents a difference between the first prediction data and the second prediction data.

In operations 441 and 443, the reconstruction loss $L_{rec}$ and the prediction loss $L_{pred}$ may be computed based on Equations (1) and (2) above.

In operation 442, the reconstruction distillation loss may be computed as follows:

$$L_{dis1} = \frac{1}{m}\sum_{i}^{m} d\left(f_{rec}^{t}(x_i; \theta_1, \theta_2), f_{rec}^{t-1}(x_i)\right) \qquad \text{Equation (3)}$$

Where $L_{dis1}$ denotes the reconstruction distillation loss, $x_i$ denotes the current traffic data that is collected during a time period t, m denotes a number of data points included in the traffic data $x_1$, $\theta_1$ denotes network parameters of the second encoder network, $\theta_2$ denotes network parameters of the second reconstruction network, $f_{rec}^{t}(x_i; \theta_1, \theta_2)$ denotes the second reconstructed data, and $f_{rec}^{t}(x_i)$ denotes the first reconstructed data.

In operation 444, the prediction distillation loss may be computed as follows:

$$L_{dis2} = \frac{1}{m}\sum_{i}^{m} d\left(f_{pred}^{t}(x_i; \theta_1, \theta_3), f_{pred}^{t-1}(x_i)\right) \qquad \text{Equation (4)}$$

Where $L_{dis2}$ denotes the prediction distillation loss, $\theta_3$ denotes network parameters of the second prediction network, $f_{pred}^{t}(x_i; \theta_1, \theta_3)$ denotes the second prediction data, and $f_{pred}^{t-1}(x_i)$ denotes the first prediction data.

The second prediction model is updated to minimize or converge the aggregated loss which is computed based on the following equation:

$$L = L_{rec} + L_{pred} + L_{dis1} + L_{dis2} \qquad \text{Equation (5)}$$

The aggregated loss is back-propagated to update network parameters $\theta_1$, $\theta_2$, and $\theta_3$ of the second prediction model.

A sequence of data points m included in the current traffic data $x_i$ are input to the first prediction model and the second prediction model, to train the second prediction model and update network parameters of the second prediction model via iterations of operations 410, 420, 430, and 440. Operations 410, 420, 430, and 440 are iterated until the aggregated loss of the second prediction model is minimized to its minimum point or a predetermined minimum value, or converges to a constant value. A mean absolute square (MAE) method or a root mean square error (RMSE) method may be applied to calculate each one or at least one of the reconstruction loss, the prediction loss, the reconstruction distillation loss, and the prediction distillation loss.

An example pseudo-code for an algorithm of training the second prediction model is provided as follows:

---
Algorithm 1: CKD Training Procedure
---

Input : $\{D^t\}_{t=1}^T$.
Output: Model $f^T$ with parameters $\theta_1$, $\theta_2$ and $\theta_3$.
1  Initialize $\theta_1$, $\theta_2$ and $\theta_3$, store $f^0$ with $\theta_1$, $\theta_2$ and $\theta_3$.
2  for $t \in \{1, 2, ..., T\}$ do
3  | Obtain $x^t$, $y^t \in D_t$.
4  | while not converged do
5  | | Pass $x^t$ through $f^t$ to obtain $f_{rec}{}^t$ and $f_{pred}{}^t$.
6  | | Compute $L_{rec}$ by Eq. (1).
7  | | Compute $L_{pred}$ by Eq. (2).
8  | | if $t > 1$ then
9  | | | Pass $x^t$ through $f^{t-1}$ to obtain $f_{rec}{}^{t-1}$ and $f_{pred}{}^{t-1}$.
10 | | | Compute $L_{dis1}$ by Eq. (3).
11 | | | Compute $L_{dis2}$ by Eq. (4).
12 | | | Compute $L$ by Eq. (5).
13 | | else
14 | | | Compute $L = L_{rec} + L_{pred}$.
15 | | Update $\theta_1$, $\theta_2$ and $\theta_3$ by minimizing $L$.
16 | end
17 | Replace $f^{t-1}$ with $f^t$ parameterized by $\theta_1$, $\theta_2$ and $\theta_3$.
18 end

---

Referring to the algorithm above, when a new task including the current traffic data is assigned, a current prediction model is obtained by minimizing a reconstruction loss and a prediction loss (see lines 6, 7, and 14-15). When a task number is larger than 1 (i.e., there is an old prediction model), the current prediction model is trained further based on knowledge transferred from the old prediction model, using a reconstruction distillation loss and a prediction distillation loss in addition to the reconstruction loss and the prediction loss (see lines 8-12). Once the training process of the second prediction model is completed, the trained second prediction model is stored to infer a future traffic load of the base station based on new traffic data.

Figure 5:
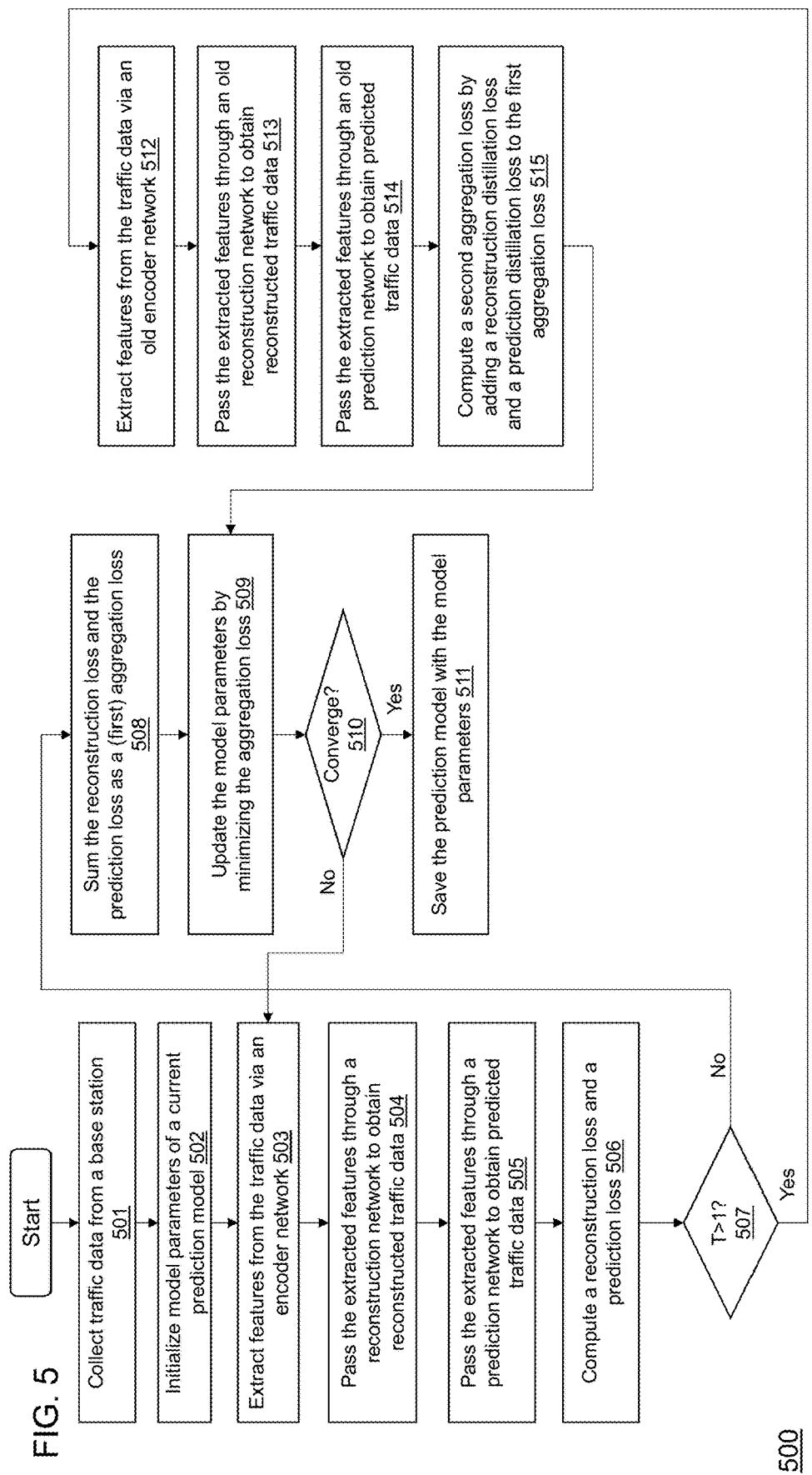
FIG. 5 is a flowchart illustrating a method of updating a traffic prediction model according to embodiments of the disclosure.

FIG. 5 is a flowchart illustrating a method 500 of updating a traffic prediction model according to embodiments of the disclosure.

In operation 501, traffic data is collected from a base station at a current task time T.

In operation 502, model parameters of a (current) prediction model are initialized to have an initial set of weights and biases. The prediction model may include an encoder network, a reconstruction network, and a prediction network. Once the model parameters of the prediction model are initialized, each of the encoder network, the reconstruction network, and the prediction network may have an initial set of weights and biases.

In operation 503, hidden features may be extracted from the traffic data via the encoder network.

In operation 504, the extracted hidden features may pass through the reconstruction network to obtain reconstructed traffic data.

In operation 505, the extracted hidden features may pass through the prediction network to obtain predicted traffic data.

In operation 506, a reconstruction loss between the (original) traffic data that is input to the encoder network, and the reconstructed traffic data that is output from the reconstruction network, and a prediction loss between the predicted traffic data and a ground-truth value, are computed.

In operation 507, it is determined whether the task number T is greater than 1. When the task number T is 1, there is no previous task and there is no previous prediction model that is trained using historical traffic data. When the task number T is greater than 1, there is at least one previously trained prediction model which can transfer knowledge from historical traffic data, to the current prediction model.

When the task number T is 1, the method 500 proceeds to operation 508. In operation 508, the reconstruction loss and the prediction loss are added to obtain a first aggregation loss.

In operation 509, the model parameters of the first prediction model are updated until the first aggregation loss is minimized or converges.

In operation 510, it is determined whether the first aggregation loss is minimized or converges. The first aggregation loss is determined to be minimized or converges when the first aggregation loss has reached its minimum point or a predetermined minimum value, or has reached a constant value. A mean absolute square (MAE) method or a root mean square error (RMSE) method may be applied to calculate the first aggregation loss.

When the first aggregation loss converges, the method 500 proceeds to operation 511 to save the prediction model with the updated model parameters. Otherwise, the prediction model is further trained via iteration of operations 503-510.

Referring back to operation 507, when the task number T is greater than 1, the method 500 proceeds to operations 512-515 to transfer knowledge from at least one previously trained prediction model (which is referred to as an old prediction model) to the current prediction model. The old prediction model and the current prediction model in FIG. 5 may refer to the first prediction model and the second prediction model in FIG. 4. The old prediction model may include an old encoder network, an old reconstruction network, and an old prediction network which may correspond to the first encoder network, the first reconstruction network, and the first prediction network of FIG. 4.

In operation 512, hidden features are extracted from the traffic data via the old encoder network.

In operation 513, the extracted hidden features pass through the old reconstruction network to obtain reconstructed traffic data.

In operation 514, the extracted hidden features pass through the old prediction network to obtain predicted traffic data.

In operation 515, a reconstructed distillation loss between the reconstructed traffic data of the current prediction model and the reconstructed traffic data of the old prediction model, and a prediction distillation loss between the predicted traffic data of the current prediction model and the predicted traffic data of the old prediction model, are computed. The reconstructed distillation loss and the prediction distillation loss are added to the first aggregation loss to obtain a second aggregation loss of the current prediction model.

In operation 509, the model parameters of the current prediction model are updated to minimize or converge the second aggregation loss.

In operation 510, it is determined whether the second aggregation loss of the current prediction model is minimized or converges. The second aggregation loss is determined to be minimized or converge when the second aggregation loss has reached its minimum point or a predetermined minimum value, or has reached a constant value. A mean absolute square (MAE) method or a root mean square error (RMSE) method may be applied to calculate the second aggregation loss.

Once the second aggregation loss is minimized or converges, the current prediction model is saved with the updated mode parameters. Otherwise, the current prediction model is further trained via iteration of operations 512-515. While operations 512 and 512 are performed, the model parameters of the old prediction model may be fixed, and only the model parameters of the current prediction model may be updated via knowledge distillation from the old prediction model and a prediction training process using the current traffic data.

Figure 6:
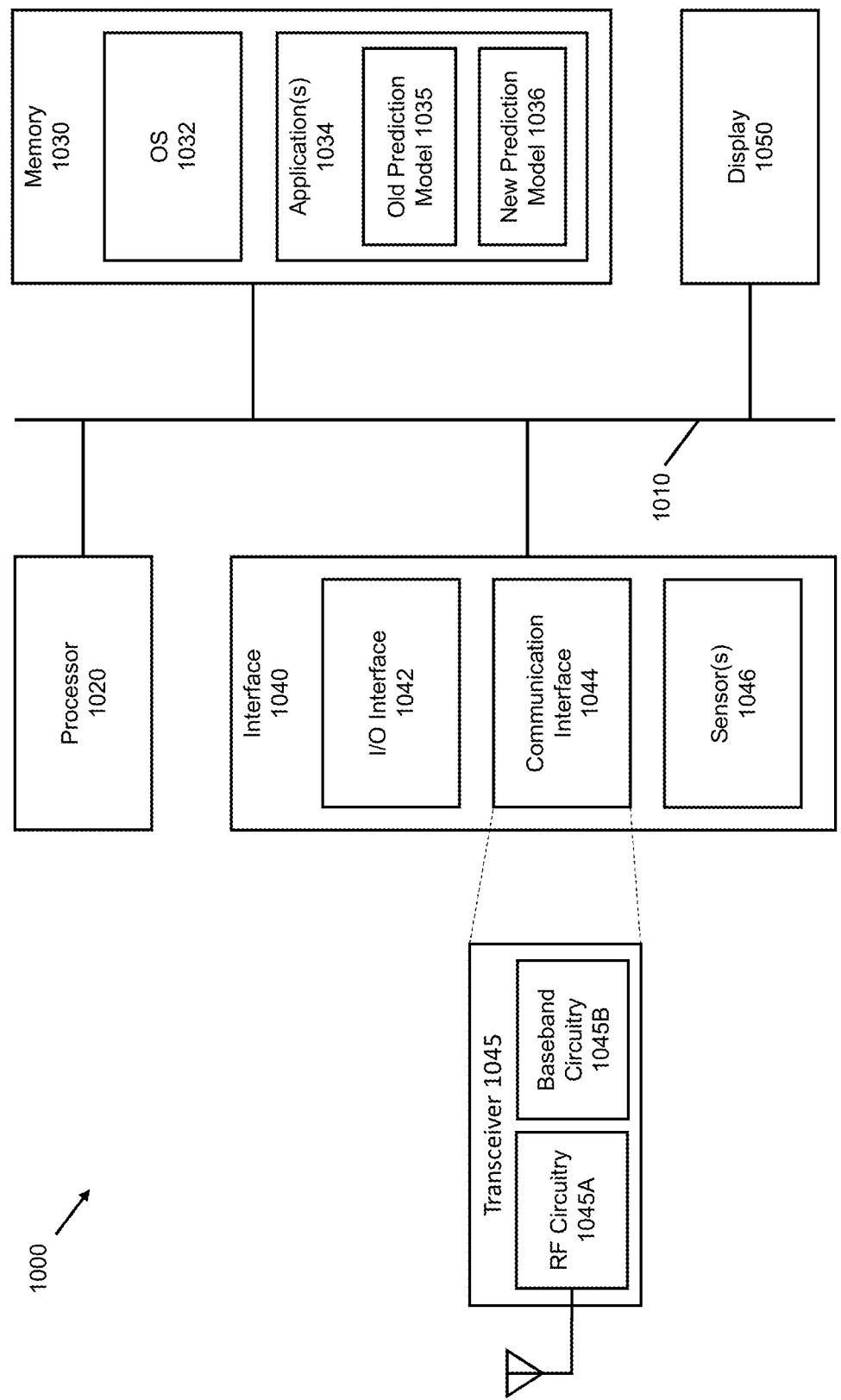
FIG. 6 is a block diagram of an electronic device according to embodiments of the disclosure.

FIG. 6 is a block diagram of an electronic device 1000 according to embodiments.

FIG. 6 is for illustration only, and other embodiments of the electronic device 1000 could be used without departing from the scope of this disclosure. For example, the electronic device 1000 may correspond to the server 120.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1000, and/or perform an operation or data processing relating to communication. For example, the processor 1020 may perform operations 200-500 illustrated in FIGS. 2-5. The processor 1020 executes one or more programs stored in the memory 1030.

The memory 1030 may include a volatile and/or non-volatile memory. The memory 1030 stores information, such as one or more of commands, data, programs (one or more instructions), applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020.

In particular, the memory 1030 stores data, computer-readable instructions, applications, and setting information for the operation of base stations of the communication system 111. The memory 1030 may store information on a bearer allocated to an accessed UE and a measurement result reported from the accessed UE.

The applications 1034 include the above-discussed embodiments. These functions can be performed by a single application or by multiple applications that each carry out one or more of these functions. For example, the applications 1034 may include artificial intelligence (AI) models for performing operations 200-500 illustrated in FIGS. 2-5. Specifically, the applications 1034 may include an old prediction model 1035 and a new prediction model 1036 according to embodiments of the disclosure. The old prediction model 1035 and the new prediction model 1036 may correspond to the first prediction model and the second prediction model illustrated in FIG. 4. The processor 1020 may obtain the old prediction model 1035 via operations 501-511, and may obtain the new prediction model 1036 via operations 501-515, with reference to FIG. 5.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the electronic device 1000.

The communication interface 1044 may include a transceiver 1045 to enable communication between the electronic device 1000 and other external devices (e.g., a target base station, a plurality of source base stations, and other servers that store teacher networks), via a wired connection, a wireless connection, or a combination of wired and wireless connections. The communication interface 1044 may permit the electronic device 1000 to receive information from another device and/or provide information to another device. For example, the communication interface 1044 may include an Ethernet interface, an optical interface, a coaxial interface, an infrared interface, a radio frequency (RF) interface, a universal serial bus (USB) interface, a Wi-Fi interface, a cellular network interface, or the like.

The transceiver 1045 of the communication interface 1044 may include a radio frequency (RF) circuitry 1045A and a baseband circuitry 1045B.

The baseband circuitry 1045B may transmit and receive a signal through a wireless channel, and may perform band conversion and amplification on the signal. The RF circuitry 1045A may up-convert a baseband signal provided from the baseband circuitry 1045B into an RF band signal and then transmits the converted signal through an antenna, and down-converts an RF band signal received through the antenna into a baseband signal. For example, the RF circuitry 1045A may include a transmission filter, a reception filter, an amplifier, a mixer, an oscillator, a digital-to-analog converter (DAC), and an analog-to-digital converter (ADC).

The transceiver 1045 may be connected to one or more antennas. The RF circuitry 1045A of the transceiver 1045 may include a plurality of RF chains and may perform beamforming. For the beamforming, the RF circuitry 1045A may control a phase and a size of each of the signals transmitted and received through a plurality of antennas or antenna elements. The RF circuitry 1045A may perform a downlink multi-input and multi-output (MIMO) operation by transmitting one or more layers.

The baseband circuitry 1045A may perform conversion between a baseband signal and a bitstream according to a physical layer standard of the radio access technology. For example, when data is transmitted, the baseband circuitry 1045B generates complex symbols by encoding and modulating a transmission bitstream. When data is received, the baseband circuitry 1045B reconstructs a reception bitstream by demodulating and decoding a baseband signal provided from the RF circuitry 1045A.

The sensor(s) 1046 of the interface 1040 can meter a physical quantity or detect an activation state of the electronic device 1000 and convert metered or detected information into an electrical signal. For example, the sensor(s) 1046 can include one or more cameras or other imaging sensors for capturing images of scenes. The sensor(s) 1046 can also include any one or any combination of a microphone, a keyboard, a mouse, and one or more buttons for touch input. The sensor(s) 1046 can further include an inertial measurement unit. In addition, the sensor(s) 1046 can include a control circuit for controlling at least one of the sensors included herein. Any of these sensor(s) 1046 can be located within or coupled to the electronic device 1000.

Referring back to the processor 1020, the processor 1020 may transmit and receive signals through the RF circuitry 1045A and the baseband circuitry 1045B. The processor 1020 may record data (e.g., target traffic data, source traffic data, and teacher networks) in the memory 1030 and read the data from the memory 1030.

For example, when the electronic device 1000 corresponds to the server 120, the processor 1020 may receive from the communication system 111, traffic data, such as information about a number of active UEs that are served by each cell of the base stations, a cell load ratio, and an internet protocol (IP) throughput per cell, and may store the information of the number of active UEs, the cell load ratio, and the PI throughput per cell, in the memory 1020. The processor 1020 may control the transceiver 1045 to transmit a request for traffic data to the communication system 111, and to receive from the server 120 the information of the number of active UEs, the cell load ratio, and the IP throughput per cell, in response to the request from the traffic data. The processor 1020 may perform operations 400 and 500 based on the communication system state information, and may transmit a forecasted communication traffic load of a target base station (e.g., a target base station BST illustrated in FIG. 1) or a forecasted communication traffic load of each of a plurality of cells of the target base station to the communication system 111. The communication system 111 may allocate communication bandwidth or UEs to the plurality of base stations of the communication system 111 or to the plurality of cells of the target base station, according to the forecasted communication traffic load, so that traffic loads are distributed relatively evenly among the plurality of base stations, and/or among the plurality of cells of the target base station.

Figure 7:
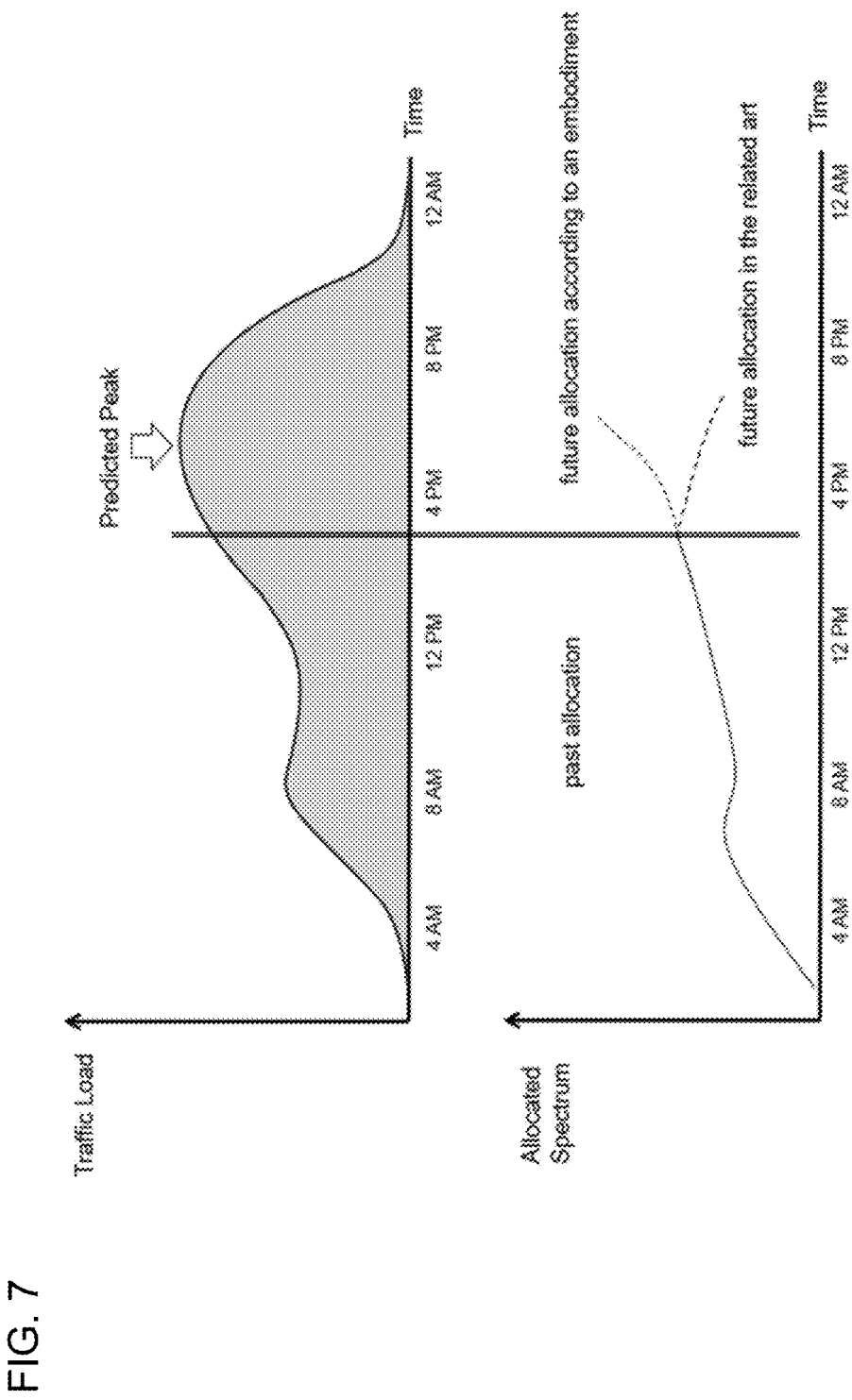
FIG. 7 illustrates a use application in which a server allocates a communication spectrum based on a predicted traffic load, according to embodiments of the disclosure.

FIG. 7 illustrates a use application in which a server allocates a communication spectrum based on a predicted traffic load, according to embodiments.

According to embodiments of the disclosure, a future traffic load of a target base station is predicted at a high accuracy via continual knowledge distillation from previously trained models. Based on the future traffic load of the target base station, a server may adjust a communication spectrum allocated to the target base station. For example, when the server predicts a peak traffic load between 4 PM and 8 PM, the server may increase the communication spectrum allocated to the target base station between the 4 PM and 8 PM.

Figure 8:
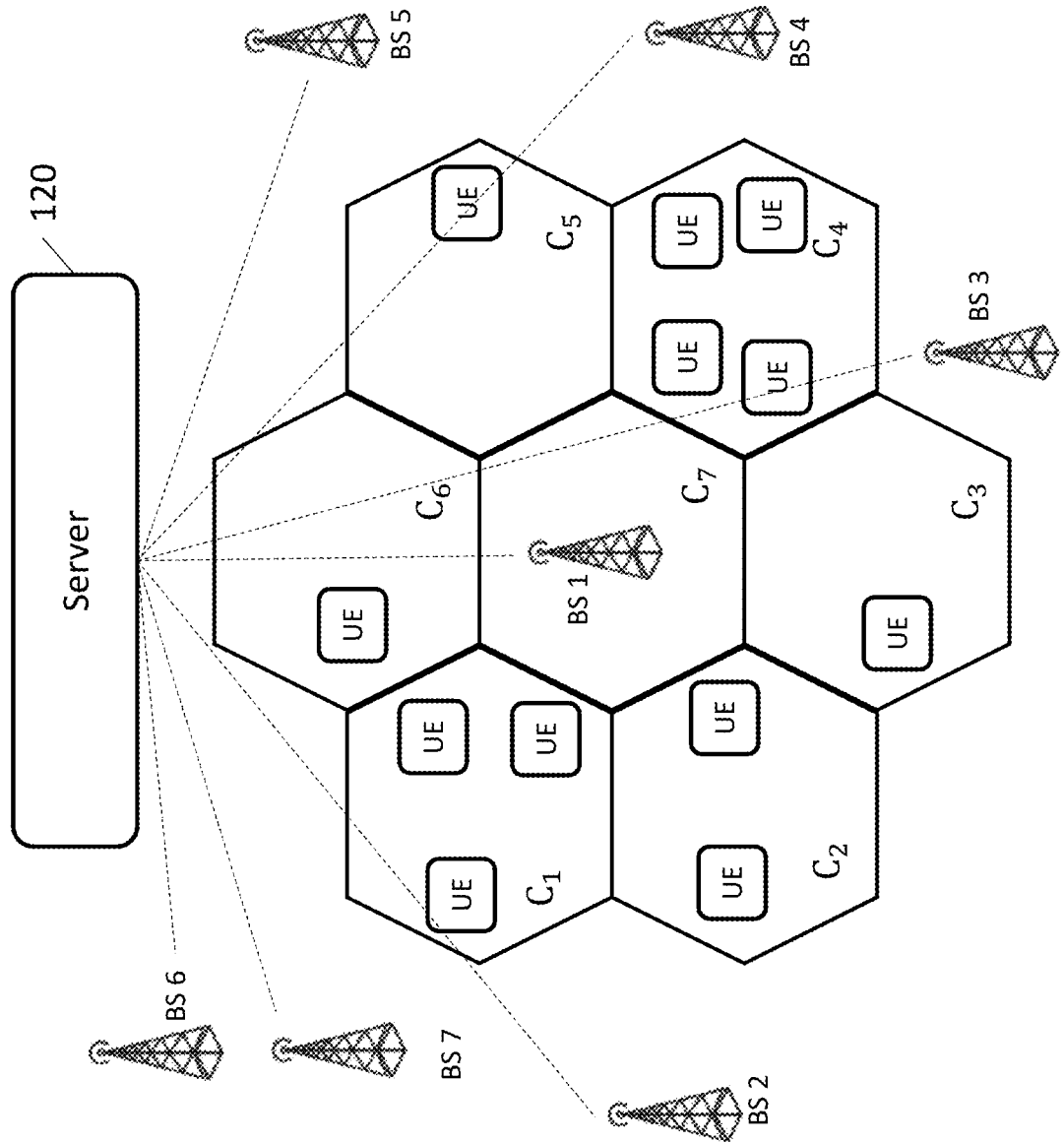
FIG. 8 illustrates a use application in which a server performs traffic load balancing between different communication cells, according to embodiments of the disclosure.

FIG. 8 illustrates a use application in which a server performs traffic load balancing between different communication cells, according to embodiments.

Referring to FIG. 8, a system for performing traffic load balancing according to an example embodiment includes a server 120, a plurality of base stations BS1-BS7 each of which serves a plurality of cells having different cell reselection priorities, and a plurality of UEs that are respectively served in the plurality of cells. Among the plurality of base stations BS1-BS7, BS1 is the target base station, and the rest of base stations BS2-BS7 are source base stations.

In an example embodiment, the target base station BS1 may serve a plurality of cells $C_1$-$C_7$ having different frequency bands $f_1$-$f_7$ and different cell reselection priorities.

The server 120 may communicate with the plurality of base stations BS1-BS7 to receive information about the state of the UEs in their serving cells, for example, whether the UEs are in an idle mode or an active mode, the number of active UEs, and an internet protocol (IP) throughput of each cell.

The server 120 may determine a cell reselection priority for each of the plurality of cells $C_1$-$C_7$ of the target base station BS1 based on a forecasted communication traffic load of the target base station BS1 that is predicted via operations 400 and/or 500. The communication traffic load may be predicted using communication system state information received from the plurality of base stations BS1-BS7. The server 120 may transmit the cell reselection priorities to the target base station BS1. The target base station BS1 may forward the cell reselection priorities to the plurality of UEs so that some of the plurality of UEs are reassigned to another cell to distribute traffic load among the plurality of cells $C_1$-$C_7$.

Figure 9:
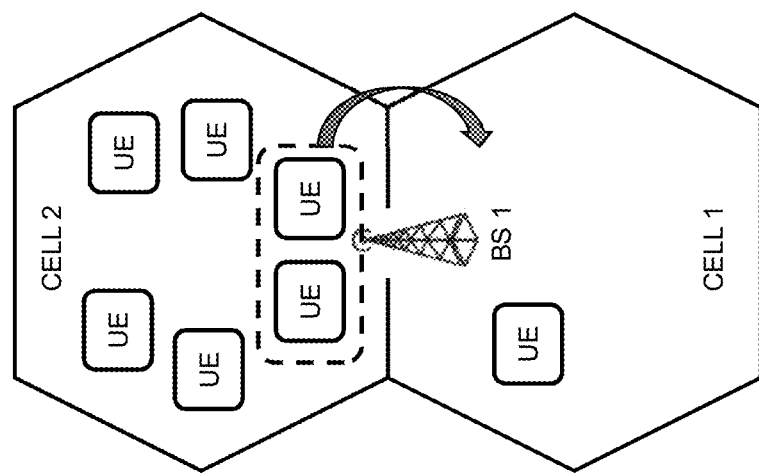
FIG. 9 illustrates a cell reselection process according to embodiments of the disclosure.

FIG. 9 illustrates a cell reselection process according to embodiments of the present disclosure.

As shown in FIG. 9, a communication system includes at least one base station (BS), a communication network, and a plurality of user equipment (UEs) that access the communication network through the at least one BS.

The at least one BS may correspond to an Evolved Node B (eNB), a 5G Node (gNB), or a 6G Node. The BS may collect status information of the UEs and may provide the UEs with access to the communication network based on the status information. Examples of the status information may include information of whether the UEs are in an active mode or an idle mode, and may also include a buffer status, an available transmission power status, and a channel status of each of the UEs.

The communication system provides a first cell Cell 1 and a second cell Cell 2, that are served by a target base station BS1. For example, when six (6) UEs are connected to Cell 1 and one (1) cell is connected to Cell 2, one or more UEs among the six UEs in Cell 2 are reassigned to Cell 1 to distribute communication traffic load between Cell 1 and Cell 2.

Specifically, in an LTE, a 5G system, or a 6G system, the target base station BS1 may determine a cell reselection priority for each cell Cell 1 and Cell 2 to which the UEs should connect, through a radio resource control releasing message. The UEs may determine a target call on which to camp based on the cell reselection priority. For each UE, the cell reselection process is performed as a probabilistic process based on the cell reselection priority. When Cell 1 has a high cell reselection priority, a given idle mode UE may have a high probability of being reselected to camp on Cell 1. The communication system may shift idle UEs from overloaded Cell 2 to less loaded Cell 1.

Figure 10:
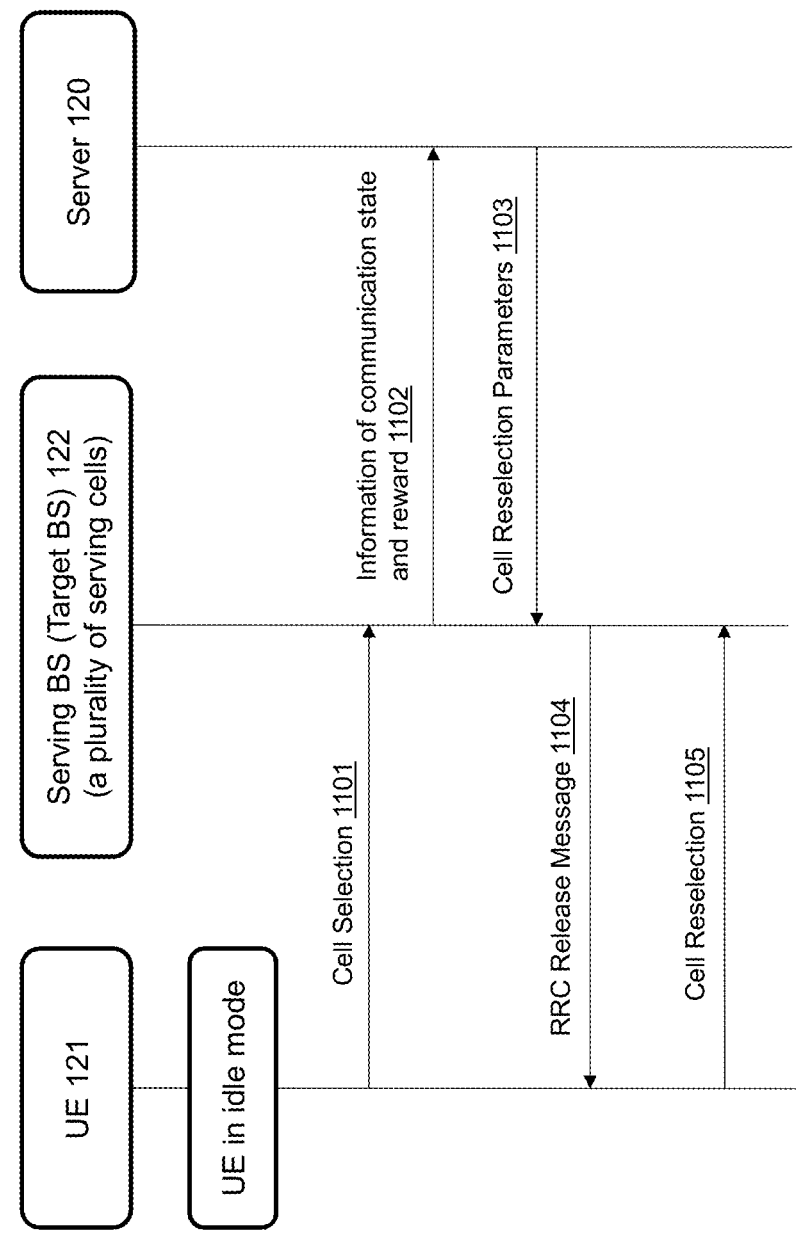
FIG. 10 illustrates a method of communicating with a user equipment (UE) and a base station (BS) to perform a cell reselection process according to embodiments.

FIG. 10 illustrates a method of communicating with a UE and a BS to perform a cell reselection process according to an example embodiment.

As shown in FIG. 10, the UE 121 in an idle mode may perform an initial cell selection in operation 1101. In order to select an initial cell, the UE 121 may scan all radio frequency (RF) channels in its operating frequency bands and may select an initial cell for the UE to camp on, based on cell selection criterion. For example, the UE 121 may select the initial cell based on various parameters, such as for example, a cell selection reception (RX) level value (Srxlev), a cell selection quality value (Squal), an offset temporarily applied to a cell (Qoffsettemp), a measured cell reception level value (Qqualmeas), a measured cell quality value (Qrxlevmeas), a minimum required RX level in the cell (Qrxlevmin), a minimum required quality level in the cell (Qqualmin). The UE 121 transmits information of the selected initial cell to a base station 122 that manages a plurality of cells, so that the UE 121 in the idle mode camps on the selected initial cell among the plurality of cells.

In operation 1102, the base station 122 may transmit traffic data, including the number of active mode UEs per cell, the cell load ratio, and the IP throughput per cell, to the server 120.

In operation 1103, the server 120 may determine cell reselection parameters based on a traffic load that is predicted by a new prediction model (e.g., the second prediction model in FIG. 4), and may transmit the cell reselection parameters to the base station 122. The cell reselection parameters may correspond to cell reselection priorities that are assigned to the plurality of cells $C_1$-$C_7$ shown in FIG. 8.

In operation 1104, the base station 122 may transmit a Radio Resource Control (RRC) Release message including the cell reselection parameters, to the UE 121.

In operation 1105, the UE 121 then may select a target cell to camp on based on the cell reselection parameters, and may send information of the selected target cell to the base station 122. For example, when a second cell $C_2$ has a higher cell reselection priority than the other neighboring cells, $C_1$ and $C_3$-$C_7$, among the plurality of cells $C_1$-$C_7$, the idle mode UE 121 has a higher probability of being reassigned to camp on the second cell $C_2$ than other neighboring cells, $C_1$ and $C_3$-$C_7$.

The forecasting method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 100, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The forecasting method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the server.

The foregoing disclosure provides illustration and description, but is not intended to be exhaustive or to limit the implementation to the precise form disclosed. Modifications and variations are possible in light of the above disclosure or may be acquired from practice of the implementation.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 1000, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the electronic device 1000.

A model related to the neural networks described above may be implemented via a software module. When the model is implemented via a software module (for example, a program module including instructions), the model may be stored in a computer-readable recording medium.

Also, the model may be a part of the electronic device 1000 described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. A server for predicting load in a communication system, the server comprising:
   at least one memory storing computer-readable instructions; and
   at least one processor configured to execute the computer-readable instructions to:
   obtain a first traffic data set from a base station during a first period of time;
   obtain a first artificial intelligence (AI) model trained to predict a traffic load based on the first traffic data set;
   obtain a second traffic data set from the base station, during a second period time that follows the first period of time;
   obtain a second AI model trained to predict a traffic load based on the second traffic data set; and
   update the second AI model based on a difference between a first traffic load that is predicted by the first AI model using the second traffic data set, and a second traffic load that is predicted by the second AI model using the second traffic data set.

2. The server of claim 1, wherein the first AI model comprises a first encoder network trained to extract first features from the first traffic data set, a first reconstruction network trained to reconstruct the first traffic data set based on the extracted first features, and a first prediction network trained to predict the traffic load based on the extracted first features,
   wherein the second AI model comprises a second encoder network trained to extract second features from the second traffic data set, a second reconstruction network trained to reconstruct the second traffic data set based on the extracted second features, and a second prediction network trained to predict the traffic load based on the extracted second features, and
   wherein the first encoder network, the first reconstruction network, and the first prediction network structurally correspond to the second encoder network, the second reconstruction network, and the second prediction network, respectively, but have the different model parameters from the second encoder network, the second reconstruction network, and the second prediction network, respectively.

3. The server of claim 2, wherein each of the first encoder network and the second encode network is a feed-forward neural network comprising hidden layers.

4. The server of claim 2, wherein each of the first reconstruction network and the second reconstruction network comprises at least one linear layer and at least one ReLU activation function layer.

5. The server of claim 1, wherein the at least one processor is further configured to:
   delete the first traffic data set after the first period of time elapses; and
   update the second AI model based on the first AI model without using the first traffic data set that is collected from the base station during the first period of time.

6. The server of claim 1, wherein the first AI model is trained to extract first features from the first traffic data set, reconstruct the first traffic data set based on the extracted first features, and predict the traffic load based on the extracted first feature,
   wherein the second AI model is trained to extract second features from the second traffic data set, reconstruct the second traffic data set based on the extracted second features, and predict the traffic load based on the extracted second feature,
   wherein the at least one processor is further configured to:
   store the updated second AI model to predict the second traffic load of the base station, in response to determining that an aggregated loss of the updated second AI model converges,
   wherein the aggregated loss includes a reconstruction loss between the second traffic data set and the reconstructed second traffic data set, a prediction loss between the predicted second traffic load and a ground-truth traffic load, a reconstruction distillation loss between the reconstructed first traffic data set and the reconstructed second traffic data set, and a prediction distillation loss between the predicted first traffic load and the predicted second traffic load, and
   wherein the aggregated loss is obtained by inputting the second traffic data set to the first AI model and the second AI model, respectively.

7. The server of claim 6, wherein the at least one processor is further configured to:
   compute a mean absolute error of the updated second AI model as the aggregated loss of the updated second AI model.

8. The server of claim 1, wherein the at least one processor is further configured to:
   apply a time-based sliding window to traffic data to obtain an n number of traffic data samples for a sequence of time slots including the first period of time and the second period of time; and
   among the n number of traffic data samples, use a first n-1 number of traffic data samples as an input vector, and use a last traffic data sample as a ground-truth traffic load,
   wherein the input vector corresponds to the first traffic data set that is input the first AI model, or the second traffic data set that is input the second AI model.

9. A method of predicting load in a communication system, the method comprising:
   obtaining a first traffic data set from a base station during a first period of time;
   obtaining a first artificial intelligence (AI) model configured to predict a traffic load based on the first traffic data set;
   obtaining a second traffic data set from the base station, during a second period time that follows the first period of time;
   obtaining a second AI model trained to predict a traffic load based on the second traffic data set; and
   updating the second AI model based on a difference between a first traffic load that is predicted by the first AI model using the second traffic data, and a second traffic load that is predicted by the second AI model using the second traffic data.

10. The method of claim 9, further comprising:
    extracting first features from the first traffic data set via a first encoder network of the first AI model;
    reconstructing the first traffic data set based on the extracted first features via a first reconstruction network of the first AI model;

predicting the traffic load based on the extracted first features via a first prediction network of the first AI model;
extracting second features from the second traffic data set via a second encoder network of the second AI model;
reconstructing the second traffic data set based on the extracted second features via a second reconstruction network of the second AI model; and
predicting the traffic load based on the extracted second features via a second prediction network of the second AI model;
wherein the first encoder network, the first reconstruction network, and the first prediction network structurally correspond to the second encoder network, the second reconstruction network, and the second prediction network, respectively, but have different model parameters from the second encoder network, the second reconstruction network, and the second prediction network, respectively.

11. The method of claim 9, further comprising:
deleting the first traffic data set after the first period of time elapses; and
updating the second AI model based on the first AI model without using the first traffic data set that is collected from the base station during the first period of time.

12. The method of claim 9, wherein the first AI model is trained to extract first features from the first traffic data set, reconstruct the first traffic data set based on the extracted first features, and predict the traffic load based on the extracted first feature,
wherein the second AI model is trained to extract second features from the second traffic data set, reconstruct the second traffic data set based on the extracted second features, and predict the traffic load based on the extracted second feature,
wherein the method further comprises: storing the updated second AI model to predict the second traffic load of the base station, in response to determining that an aggregated loss of the updated second AI model converges,
wherein the aggregated loss includes a reconstruction loss between the second traffic data set and the reconstructed second traffic data set, a prediction loss between the predicted second traffic load and a ground-truth traffic load, a reconstruction distillation loss between the reconstructed first traffic data set and the reconstructed second traffic data set, and a prediction distillation loss between the predicted first traffic load and the predicted second traffic load, and
wherein the aggregated loss is obtained by inputting the second traffic data set to the first AI model and the second AI model, respectively.

13. The method of claim 12, further comprising:
computing a mean absolute error of the updated second AI model as the aggregated loss of the updated second AI model.

14. The method of claim 9, further comprising:
applying a time-based sliding window to traffic data to obtain an n number of traffic data samples for a sequence of time slots including the first period of time and the second period of time; and
among the n number of traffic data samples, using a first n-1 number of traffic data samples as an input vector, and using a last traffic data sample as a ground-truth traffic load,
wherein the input vector corresponds to the first traffic data set that is input the first AI model, or the second traffic data set that is input the second AI model.

15. A non-transitory computer readable storage medium which is configured to, when executed by at least one processor, to perform a method of predicting load in a communication system, the method comprising:
obtaining a first traffic data set from a base station during a first period of time;
obtaining a first artificial intelligence (AI) model trained to predict a traffic load based on the first traffic data set;
obtaining a second traffic data set from the base station, during a second period time that follows the first period of time;
obtaining a second AI model trained to predict a traffic load based on the second traffic data set; and
updating the second AI model based on a difference between a first traffic load that is predicted by the first AI model using the second traffic data, and a second traffic load that is predicted by the second AI model using the second traffic data.

16. The non-transitory computer readable storage medium of claim 15, wherein the method further comprises:
extracting first features from the first traffic data set via a first encoder network of the first AI model;
reconstructing the first traffic data set based on the extracted first features via a first reconstruction network of the first AI model;
predicting the traffic load based on the extracted first features via a first prediction network of the first AI model;
extracting second features from the second traffic data set via a second encoder network of the second AI model;
reconstructing the second traffic data set based on the extracted second features via a second reconstruction network of the second AI model; and
predicting the traffic load based on the extracted second features via a second prediction network of the second AI model;
wherein the first encoder network, the first reconstruction network, and the first prediction network structurally correspond to the second encoder network, the second reconstruction network, and the second prediction network, respectively, but have different model parameters from the second encoder network, the second reconstruction network, and the second prediction network, respectively.

17. The non-transitory computer readable storage medium of claim 15, wherein the method further comprises:
deleting the first traffic data set after the first period of time elapses; and
updating the second AI model based on the first AI model without using the first traffic data set that is collected from the base station during the first period of time.

18. The non-transitory computer readable storage medium of claim 15, wherein the first AI model is trained to extract first features from the first traffic data set, reconstruct the first traffic data set based on the extracted first features, and predict the traffic load based on the extracted first feature,
wherein the second AI model is trained to extract second features from the second traffic data set, reconstruct the second traffic data set based on the extracted second features, and predict the second traffic load based on the extracted second feature,
wherein the method further comprises: storing the updated second AI model to predict the second traffic load of the base station, in response to determining that an aggregated loss of the updated second AI model converges, and wherein the aggregated loss includes a reconstruction loss between the second traffic data set and the reconstructed second traffic data set, a prediction loss between the predicted second traffic load and a ground-truth traffic load, a reconstruction distillation loss between the reconstructed first traffic data set and the reconstructed second traffic data set, and a prediction distillation loss between the predicted first traffic load and the predicted second traffic load.

19. The non-transitory computer readable storage medium of claim 15, wherein the method further comprises:

applying a time-based sliding window to traffic data to obtain an n number of traffic data samples for a sequence of time slots including the first period of time and the second period of time; and among the n number of traffic data samples, using a first n-1 number of traffic data samples as an input vector, and using a last traffic data sample as a ground-truth traffic load, wherein the input vector corresponds to the first traffic data set that is input the first AI model, or the second traffic data set that is input the second AI model.

* * * * *